UNITED STATES PATENT OFFICE.

ERIC A. STARKE, OF SAN RAFAEL, CALIFORNIA.

COMPOUND NITRATE AND METHOD OF MAKING SAME.

SPECIFICATION forming part of Letters Patent No. 599,743, dated March 1, 1898.

Application filed May 17, 1897. Serial No. 636,870. (No specimens.)

*To all whom it may concern:*

Be it known that I, ERIC A. STARKE, a citizen of the United States, residing at San Rafael, county of Marin, State of California, have invented an Improvement in the Manufacture of Nitrates; and I hereby declare the following to be a full, clear, and exact description of the same.

My invention relates to the manufacture of nitrates.

Its object is to provide a means for utilizing the waste nitric acid and vapors created by the use of nitric acid in various manufacturing processes, such as the manufacture of nitroglycerin, picric acid, nitrobenzene, and kindred processes.

It consists, essentially, in converting the waste nitric acid and vapors into the nitrates of alkaline-earth metals and then combining the said nitrates with the nitrates of alkaline metals, which are less deliquescent.

In the manufacture of nitroglycerin and kindred high explosives there has always been a great waste of nitric acid and nitrous fumes or vapors caused by the necessary use of an excess of nitric acid and certain decompositions which occur during the process. Large quantities of nitrate of soda are also used in the manufacture.

In my process I unite the waste acid or acid vapors with some form of alkaline-earth-metal salt which is comparatively cheap, and thus produce alkaline-earth-metal nitrates. These alkaline-earth-metal nitrates are very deliquescent and can only be partially dried, and this with great difficulty, and they are therefore unsuited for the manufacture of explosives. Neither can they be used in the manufacture of nitric acid, because when subjected to the sulfuric acid which is used in this manufacture the resulting sulfate will be too hard to be easily removed. I have discovered that by combining these alkaline-earth-metal nitrates with the alkaline-metal nitrates I can overcome these objections and greatly economize in the production of nitrates and nitric acid.

In producing concentrated nitric acid or nitrates from the waste nitric acid or nitrogen gases of various nitrating processes I first take a cheap form of any of the alkaline-earth-metal salts which are capable of forming a nitrate when brought into contact with nitric acid or such oxids of nitrogen as will in the presence of air and moisture combine to form nitrates with slaked lime, chalk, magnesite, or other cheap form of calcium or magnesium salts. These are very satisfactory for my purpose. The salt employed is brought into contact with nitric acid or said oxids of nitrogen—that is, such oxids as form with nitrogen in the presence of air and moisture—and the nitrate thus produced is evaporated until the aqueous solution becomes of a syrupy consistency. I then add to the mass a calculated amount of alkaline-metal nitrate, such as sodium or potassium nitrate. The proportions may be approximately from twenty-five per cent. of the earth-metal nitrate upward and a corresponding proportion of the alkaline-metal nitrate. The mass is then heated to a temperature of approximately about 600° Fahrenheit, until no more water-vapor will pass off and it has become a transparent liquid. It is then run into molds and allowed to cool, or it may be poured upon a cold surface and afterward chipped off as soon as solidification takes place. It is then ready to be used and is placed in a retort and distilled with concentrated sulfuric acid to produce nitric acid, or when it is to be used in the manufacture of an explosive it is pulverized sufficiently for the purpose. It is impossible to dry the nitrates of the alkaline-earth metals economically or sufficiently for the purposes desired, and they are especially objectionable in the manufacture of powder on account of deliquescence. I have also found that when heated to a higher temperature for the purpose of drying more perfectly a partial decomposition takes place.

The calcium and other alkaline-earth-metal nitrates cannot be readily melted, but they are easily soluble in molten alkaline-metal nitrates, such as those of sodium or potassium, and will form a homogeneous mass with these nitrates, which can then be employed for the purposes above described.

The addition of the more stable alkaline-metal nitrates to the easily-decomposable alkaline-earth-metal nitrates practically prevents this decomposition and renders the compound thus produced available for such uses as above described, while greatly cheapening the work.

Having thus described my invention, what I claim as new, and desire to secure by Letters Patent, is—

1. The method of making a compound nitrate consisting in converting an alkaline-earth-metal salt into a nitrate, then dehydrating the nitrate thus produced by dissolving it in a molten alkaline-metal nitrate.

2. The method of dehydrating an alkaline-earth-metal nitrate consisting in fusing it with an alkaline-metal nitrate.

3. As a new article of manufacture, a fused compound consisting of an alkaline-earth-metal nitrate with an alkaline-metal nitrate, substantially as set forth.

In witness whereof I have hereunto set my hand.

ERIC A. STARKE.

Witnesses:
DEMETRIUS G. SCOFIELD,
HOLLAND SMITH,
S. H. NOURSE.